(12) United States Patent
Oonnoonny

(10) Patent No.: US 11,148,780 B2
(45) Date of Patent: Oct. 19, 2021

(54) AIRCRAFT FUSELAGE AND STRUCTURAL CABLE FOR AIRCRAFT FUSELAGE

(71) Applicant: Aurora Flight Sciences Corporation, Manassas, VA (US)

(72) Inventor: Abraham Oonnoonny, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 586 days.

(21) Appl. No.: 15/850,274

(22) Filed: Dec. 21, 2017

(65) Prior Publication Data

US 2019/0193831 A1   Jun. 27, 2019

(51) Int. Cl.
*B64C 1/00*   (2006.01)
*B64C 1/06*   (2006.01)
(Continued)

(52) U.S. Cl.
CPC ............... *B64C 1/069* (2013.01); *B64C 1/00* (2013.01); *B64C 1/061* (2013.01); *D07B 1/02* (2013.01);
(Continued)

(58) Field of Classification Search
CPC B64C 1/069; B64C 1/00; B64C 1/061; B64C 2001/0045
See application file for complete search history.

(56) References Cited

U.S. PATENT DOCUMENTS 1,681,331 A   8/1928   Fokker 3,405,893 A * 10/1968 Rajau ...................... B64C 39/00
244/119
(Continued)

FOREIGN PATENT DOCUMENTS

EP   0812764 A2   12/1997
EP   0899189 A2   3/1999
(Continued)

OTHER PUBLICATIONS

Drela, M., "Development of the D8 Transport Configuration," 29th AIAA Applied Aerodynamics Conference, AIAA 2011-3970, Honolulu, HI, 2011.
(Continued)

*Primary Examiner* — Brian M O'Hara
*Assistant Examiner* — Keith L Dixon
(74) *Attorney, Agent, or Firm* — Michael Stanley Tomsa; McAndrews, Held & Malloy, Ltd.; Eugene H. Nahm

(57) ABSTRACT

A wide body aircraft is discussed having a fuselage with a first structural element, a second structural element, a wide-body fuselage section, and a plurality of tension members. Each of the first structural element and the second structural element may be arranged to traverse a longitudinal length of the wide-body fuselage section. The wide-body fuselage section may comprise a set of side-by-side fuselage subassemblies, where the set of side-by-side fuselage subassemblies can be coupled to one another via the first structural element and the second structural element. The plurality of tension members can be arranged to manage tension between the first structural element and the second structural element. The plurality of tension members can be configured to remain flexible under a compression load, while managing tension therebetween.

20 Claims, 12 Drawing Sheets

(51) Int. Cl.
 *D07B 1/06* (2006.01)
 *D07B 1/02* (2006.01)
(52) U.S. Cl.
 CPC .... *D07B 1/0673* (2013.01); *B64C 2001/0045* (2013.01); *D07B 2201/2046* (2013.01); *D07B 2205/2014* (2013.01); *D07B 2205/306* (2013.01); *D07B 2205/3007* (2013.01); *D07B 2205/3025* (2013.01)

(56) References Cited

U.S. PATENT DOCUMENTS

| | | | | |
|---|---|---|---|---|
| 4,674,712 | A * | 6/1987 | Whitener | B64C 1/00 244/119 |
| 5,086,996 | A * | 2/1992 | Roeder | B64C 1/061 244/118.5 |
| 5,921,593 | A * | 7/1999 | Gassert | B64C 1/00 244/118.2 |
| 7,395,989 | B2 * | 7/2008 | Saint-Jalmes | B64D 11/00 244/118.1 |
| 7,650,742 | B2 | 1/2010 | Ushijima | |
| 8,398,022 | B2 * | 3/2013 | Cazals | B64D 27/20 244/119 |
| 2010/0019082 | A1 | 1/2010 | Carter et al. | |
| 2015/0344120 | A1 * | 12/2015 | Dazet | F16G 11/12 244/119 |

FOREIGN PATENT DOCUMENTS

| | | |
|---|---|---|
| GB | 2169256 A | 7/1986 |
| WO | 93/24364 A2 | 12/1993 |

OTHER PUBLICATIONS

Greitzer, E. M., et al., "MIT N+3 Aircraft Concept Designs and Trade Studies, Final Report," NASA/CR-2010-216794/ vol. I, NASA, 2010.
National Academies of Sciences, Engineering, and Medicine, editor, Commercial Aircraft Propulsion and Energy Systems Research: Reducing Global Carbon Emissions, doi:10.17226/23490 2, The National Academies Press, Washington, DC, 2016, p. 24.
Drela, M., "TASOPT 2.00, Transport Aircraft System OPTimization," Tech. rep., Massachusetts Institute of Technology, Cambridge, MA, 2010.
Uranga, A., et al., "Preliminary Experimental Assessment of the Boundary Layer Ingestion Benefit for the D8 Aircraft," 52nd Aerospace Sciences Meeting, AIAA 2014-0906, National Harbor, MD, 2014.
Velicki, A., "Damage Arresting Composites for Shaped Vehicles," NASA/CR-2009-215932, NASA Langley Research Center, Hampton, VA, 2009.
Federal Aviation Administration, "Part 25 Airworthiness Standards: Transport Category Airplanes, Subpart C-Structure, Emergency Landing Conditions," FAR 25.561, Federal Aviation Administration, 1997.
Chambers, Jeffrey T., et al., "Structural Optimization Study of the D8 Double-Bubble Composite Fuselage," American Institute of Aeronautics and Astronautics.
Chambers, Jeffrey T., et al., "3-D Woven Preform Joint Testing to Support the D8 Double-Bubble Composite Fuselage Design," Paper No. 0227, Jun. 30, 2017.
Liao, Lin et al., "A review of airship structural research and development," Progress in Aerospace Sciences, Oxford, GB, vol. 45, No. 4-5, May 1, 2009 (May 1, 2009).
Extended European search report for Application No. EP 18214190.3, dated Apr. 17, 2019.
Examination report for Application No. EP 18214190.3, dated Apr. 17, 2020, pp. 1-6, European Patent Office, Germany.

* cited by examiner

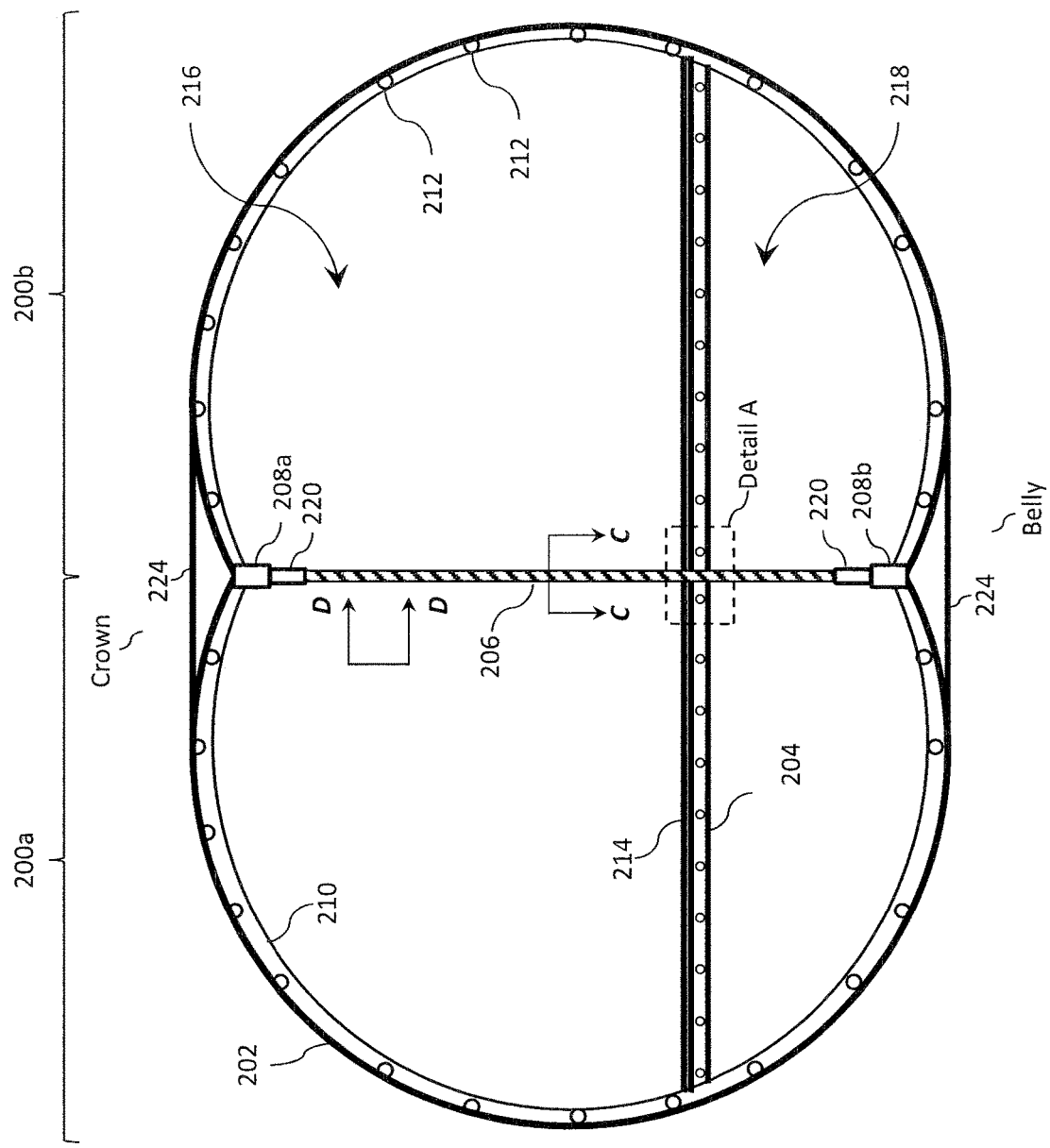
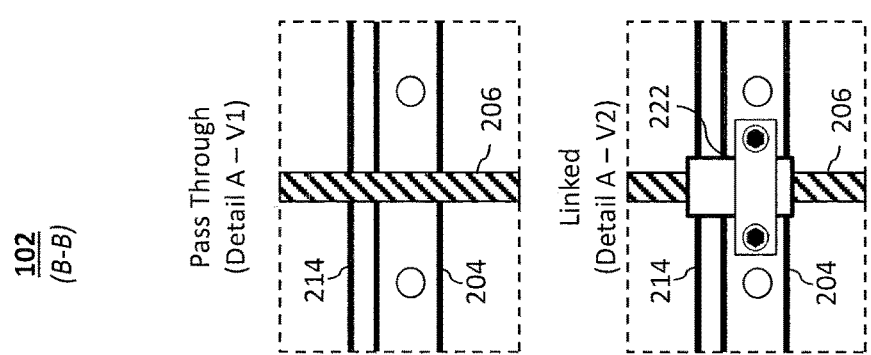
Figure 2c

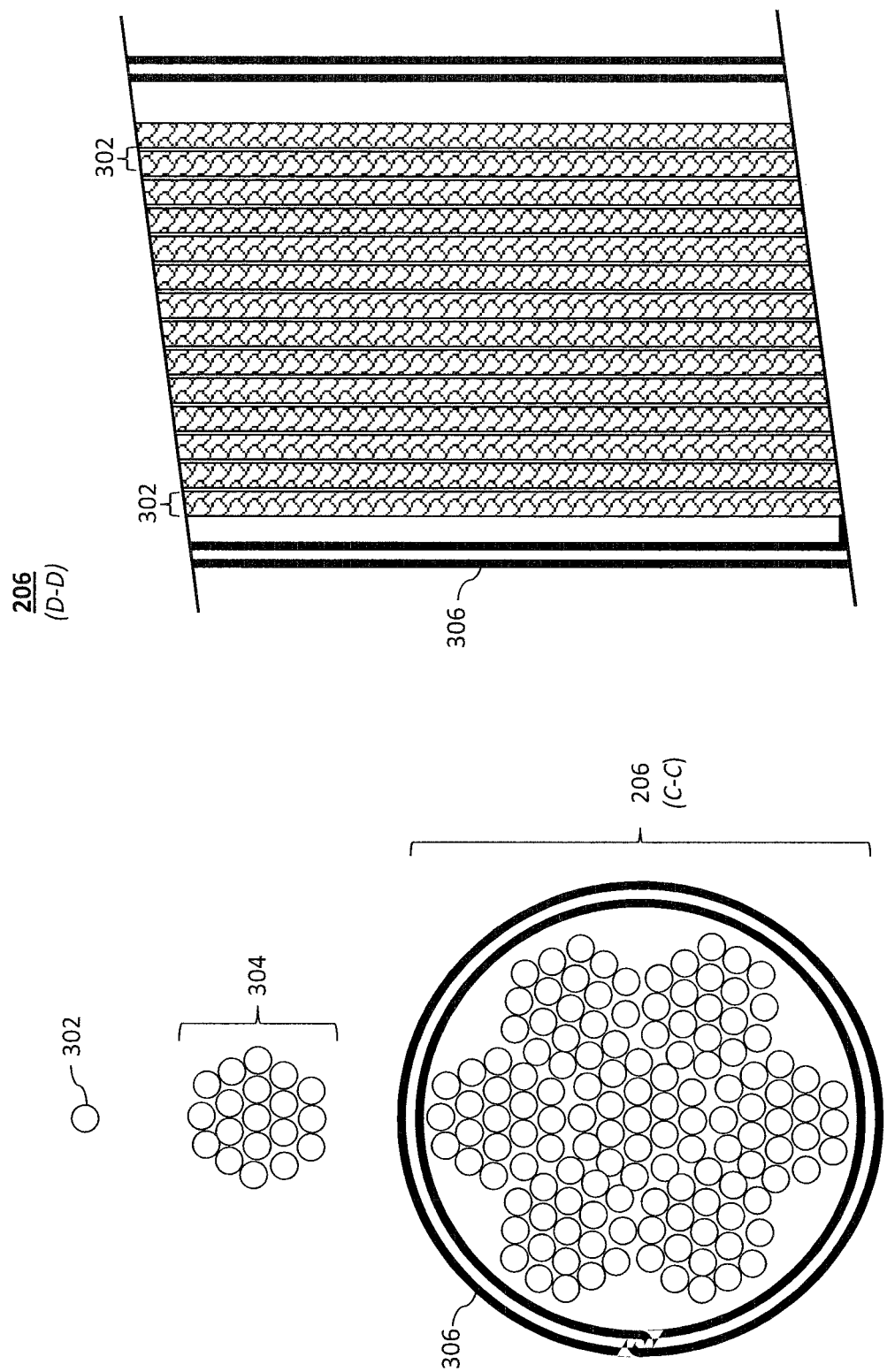

AIRCRAFT FUSELAGE AND STRUCTURAL CABLE FOR AIRCRAFT FUSELAGE

STATEMENT OF GOVERNMENT INTEREST

This invention was made with government support under Contract Number NND15AC56C awarded by the National Aeronautics and Space Administration (NASA) and Contract Number DTFAWA-15-A-80014 awarded by the Federal Aviation Administration (FAA). The government has certain rights in the invention.

TECHNICAL FIELD

The present disclosure relates to an advanced fuel-efficient aircraft, more specifically to airframes for advanced fuel-efficient aircraft, and even more specifically, to fuselages and wide-body fuselages with improved structural support elements.

BACKGROUND

There is a strong economic desire to improve the fuel efficiency of commercial aircraft. The basic aircraft platform, however, has not changed since the dawn of the commercial jet age. The dominant commercial aircraft configuration—a tube-and-wing configuration—is a highly optimized and mature platform from which it is becoming increasingly difficult to extract further fuel efficiency improvements. Therefore, alternative commercial aircraft configurations have been explored.

Instead of a traditional tube-and-wing configuration, other aircraft configurations may be employed to increase efficiency, such as a wide-body fuselage. A wide-body fuselage offers certain advantages over a tubular fuselage. For example, increased lift generated by the wide-body fuselage means that smaller wings may be used to carry the weight of the aircraft, thereby resulting in less fuel needed to fly a given flight plan. Moreover, a wide-body fuselage allows for integration of engines at the back (aft) end of the fuselage, which can ingest the boundary layer traveling over the wide-body fuselage using a technique known as boundary layer ingestion (BLI). BLI further reduces the thrust requirements of the wide-body aircraft, which means that smaller engines can be used to reduce both weight and fuel consumption.

While a wide-body fuselage offers numerous efficiency improvements, the wide-body fuselage introduces structural complexities compared to tubular and elliptical fuselage designs. In an elliptical fuselage, inflections typically occur at the boundary between the passenger cabin and baggage compartment, in which case the floor beams react this expansion load internally. In the case of a wide-body fuselage, inflections can occur at the top and bottom of the wide-body fuselage, where the aircraft outer mold line is generally flat (or planar) compared to the remainder of the fuselage. Therefore, in a wide-body fuselage, structural elements should also run vertically between the top and bottom to counter these inflections; however, it is impractical to use traditional beams or bulkheads due to space constraints and aesthetics in the passenger cabin. In view of the foregoing, a need exists for a novel wide-body fuselage with improved structural support elements that overcome the deficiencies in the prior art.

SUMMARY

The present disclosure is directed to an advanced fuel-efficient aircraft, more specifically to airframes for advanced fuel-efficient aircraft, and even more specifically, to fuselages and wide-body fuselages with improved structural support elements.

According to a first aspect, a fuselage comprises: an upper central structural element and a lower central structural element, wherein each of the upper central structural element and the lower central structural element is arranged to traverse a longitudinal length of the fuselage; a set of side-by-side fuselage subassemblies coupled to one another via the upper central structural element and the lower central structural element; and a plurality of tension members arranged to manage tension between the upper central structural element and the lower central structural element, wherein the plurality of tension members are configured to remain flexible under a compression load.

According to a second aspect, a fuselage comprises: a wide-body fuselage section; a first structural element and a second structural element, wherein each of the first structural element and the second structural element is arranged to traverse a longitudinal length of the wide-body fuselage section; and a plurality of tension members arranged to manage tension between the first structural element and the second structural element, wherein the plurality of tension members is configured to remain flexible under a compression load.

According to a third aspect, a method is provided for managing tension in a wide-body fuselage. The method may comprise: providing a wide-body fuselage having a first structural element and a second structural element, wherein each of the first structural element and the second structural element is arranged to traverse a longitudinal length of the wide-body fuselage; and coupling a plurality of tension members between the first structural element and the second structural element, wherein the plurality of tension members are configured to remain flexible under a compression load.

In certain aspects, the wide-body fuselage section comprises a set of side-by-side fuselage subassemblies coupled to one another via the first structural element and the second structural element.

In certain aspects, the set of side-by-side fuselage subassemblies are arranged to define a non-circular cross-section along a lateral length of the wide-body fuselage section.

In certain aspects, the non-circular cross-section comprises an outer mold line having a double-bubble shape or a generally elliptic shape.

In certain aspects, each of the plurality of tension members comprises a cable bundle comprising a plurality of strands.

In certain aspects, the plurality of strands comprises at least one of carbon fiber, steel, and aluminum.

In certain aspects, the cable bundle comprises a protective sleeve.

In certain aspects, the protective sleeve comprises a para-aramid synthetic fiber.

In certain aspects, the plurality of strands are arranged to define a plurality of strand bundles, which are arranged to define the cable bundle.

In certain aspects, the plurality of strands are twisted or braided to define the plurality of strand bundles.

In certain aspects, the cable bundle is coupled (1) at a first end to a first lug fitting fixed to the first structural element and (2) at a second end to a second lug fitting fixed to the second structural element.

In certain aspects, the cable bundle is coupled to the first lug fitting via a first clevis fitting and to the second lug fitting via a second clevis fitting.

In certain aspects, the first lug fitting is fixed to the first structural element via a first gusseted fitting and the second lug fitting is fixed to the second structural element via a second gusseted fitting.

In certain aspects, the fuselage further comprises a plurality of floor beams arranged to support a cabin floor within the wide-body fuselage section, wherein the plurality of floor beams are generally perpendicular to the plurality of tension members.

In certain aspects, the wide-body fuselage section comprises a plurality of stringers positioned along the longitudinal length, wherein a fuselage skin is joined to the plurality of stringers.

In certain aspects, each of the first structural element and the second structural element couples with the wide-body fuselage section via a Y-joint.

In certain aspects, the Y-joint is configured to transfers at least a portion of a pressure load between an aircraft skin and the cable bundle.

In certain aspects, the wide-body fuselage section has a height-to-width aspect ratio between 1.0:1.25 and 1.0:1.75.

In certain aspects, the cable bundle is coupled to the first lug fitting via a first clevis fitting and to the second lug fitting via a second clevis fitting.

In certain aspects, the cable bundle is coupled to the first lug fitting via a first shackle and to the second lug fitting via a second shackle.

In certain aspects, the first lug fitting is fixed to the upper central structural element via a first gusseted fitting and the second lug fitting is fixed to the lower central structural element via a second gusseted fitting.

In certain aspects, each of the upper central structural element and the lower central structural element is a keel beam or a longeron.

In certain aspects, the plurality of tension members is evenly distributed along the longitudinal length of the fuselage assembly.

In certain aspects, each of the set of side-by-side fuselage subassemblies comprises a plurality of frames arranged to define a shape of the fuselage lobe, wherein each of the plurality of frames interfaces with each of the upper central structural element and the lower central structural element via a Y-joint.

In certain aspects, each of said plurality of frames is shaped as a circular ring that is clipped on one side.

In certain aspects, each of said plurality of frames has an arc length between 3.5 radians and 4.5 radians.

In certain aspects, the fuselage skin is co-cured with at least one of said plurality of stringers.

DESCRIPTION OF THE DRAWINGS

These and other advantages of the present invention may be readily understood with reference to the following specifications and attached drawings wherein:

FIG. 1b illustrates a top plan view of the aircraft of FIG. 1a.

FIG. 1c illustrates a side view of the aircraft of FIG. 1a.

FIG. 1d illustrates a rear view of the aircraft of FIG. 1a.

FIG. 2c illustrates a second cut-away view of the wide-body fuselage taken along cross-section B-B of FIG. 1c.

FIG. 3a illustrates cut-away views of an example strand, strand bundle, and cable bundle taken along cross-section C-C of FIG. 2c.

FIG. 3b illustrates a cut-away view of the example cable bundle taken along cross-section D-D of FIG. 2c.

DETAILED DESCRIPTION

Figure 1A:
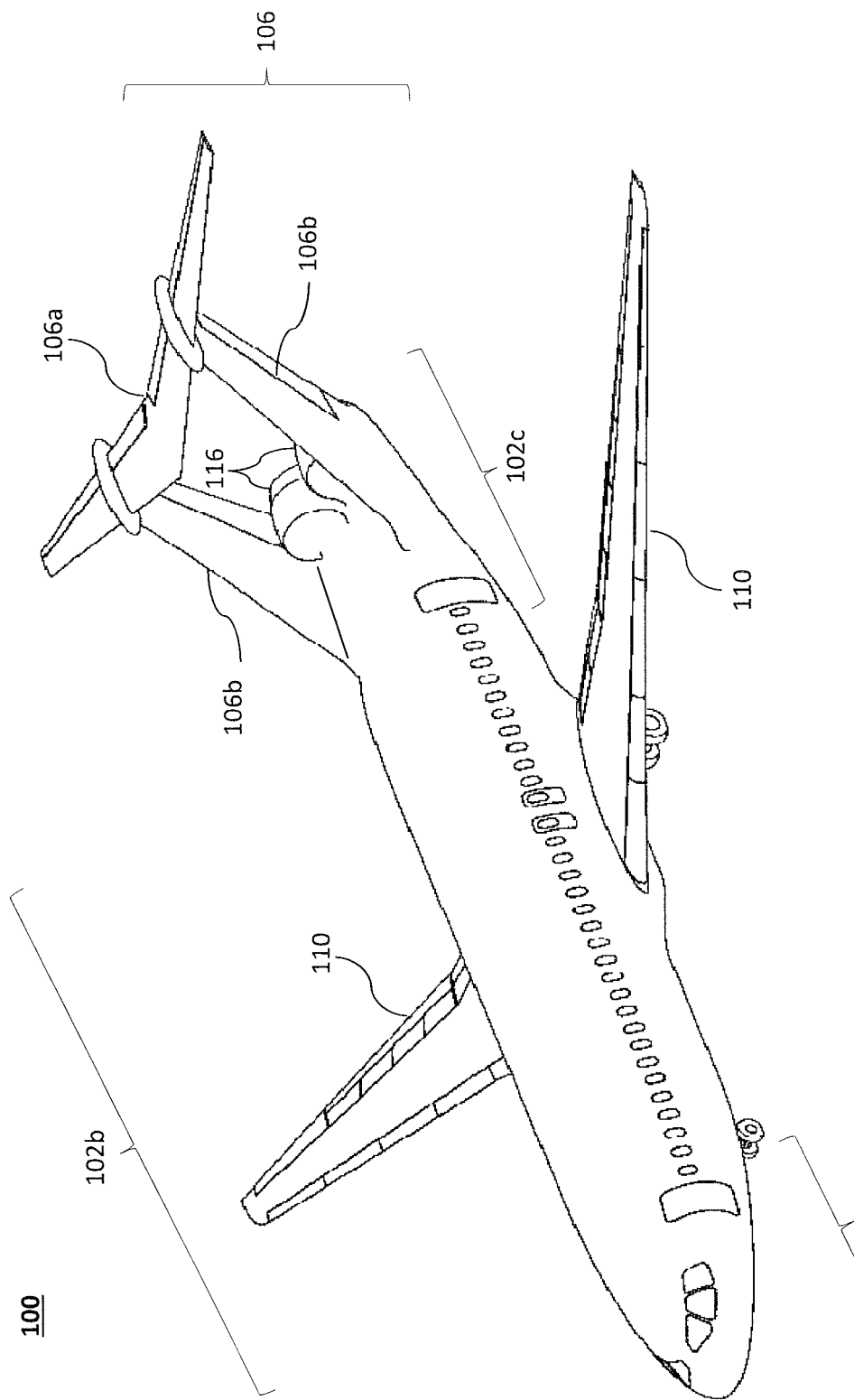
FIG. 1a illustrates an isometric view of an example aircraft in accordance with an aspect of the present disclosure.

Preferred embodiments of the present disclosure may be described hereinbelow with reference to the accompanying drawings. In the following description, well-known functions or constructions are not described in detail because they may obscure the disclosure in unnecessary detail.

In the following description, it is understood that terms such as "first," "second," "top," "bottom," "side," "front," "back," and the like are words of convenience and are not to be construed as limiting terms. Further, the use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. For this disclosure, the following terms and definitions shall apply.

The terms "aerial vehicle" and "aircraft" refer to a machine capable of flight, including, but not limited to, traditional aircraft and VTOL aircraft.

The terms "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The term "composite material" refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material.

The term "composite structure" as used herein, refers to structures or components fabricated, at least in part, using a composite material, including, without limitation, composite laminates.

The present disclosure is directed to an advanced fuel-efficient aircraft, more specifically to airframes for advanced fuel-efficient aircraft, and even more specifically, to fuselages and wide-body fuselages with improved structural support elements. In one aspect, the wide-body fuselage may employ efficient, tension-only structural members configured to react pressure loads in a wide-body aircraft fuselage (e.g., those in the vertical direction—between the crown and the belly of the wide-body fuselage). The tension-only structural member may be, for example, a cable bundle. The disclosure further describes the attachment geometry thereof and possible incorporation into the wide-body fuselage structure.

Figure 1B:
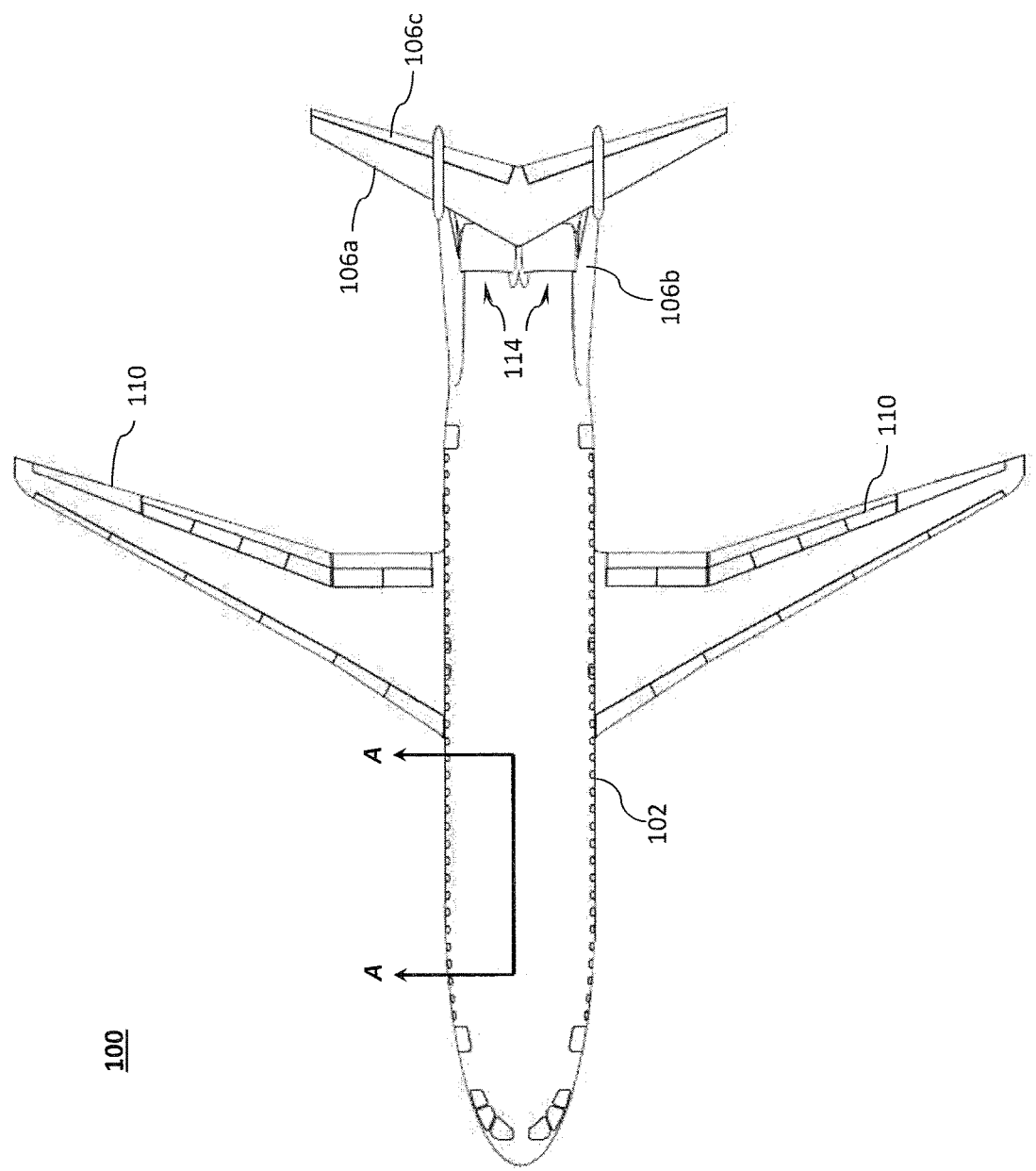
Figure 1C:
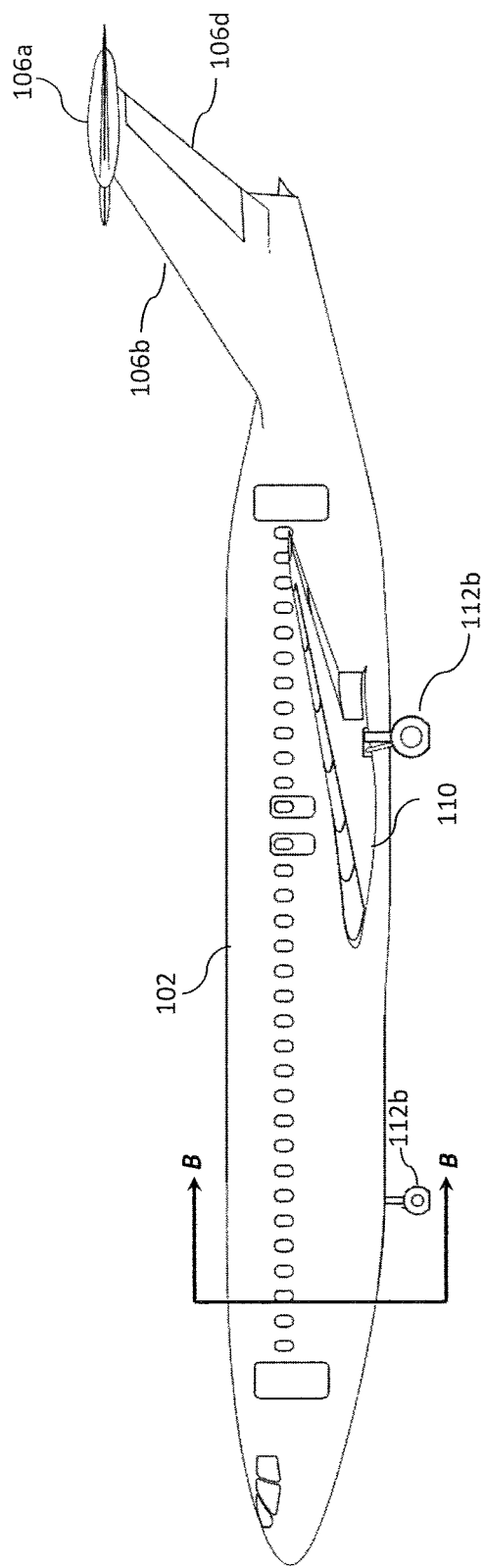
Figure 1D:
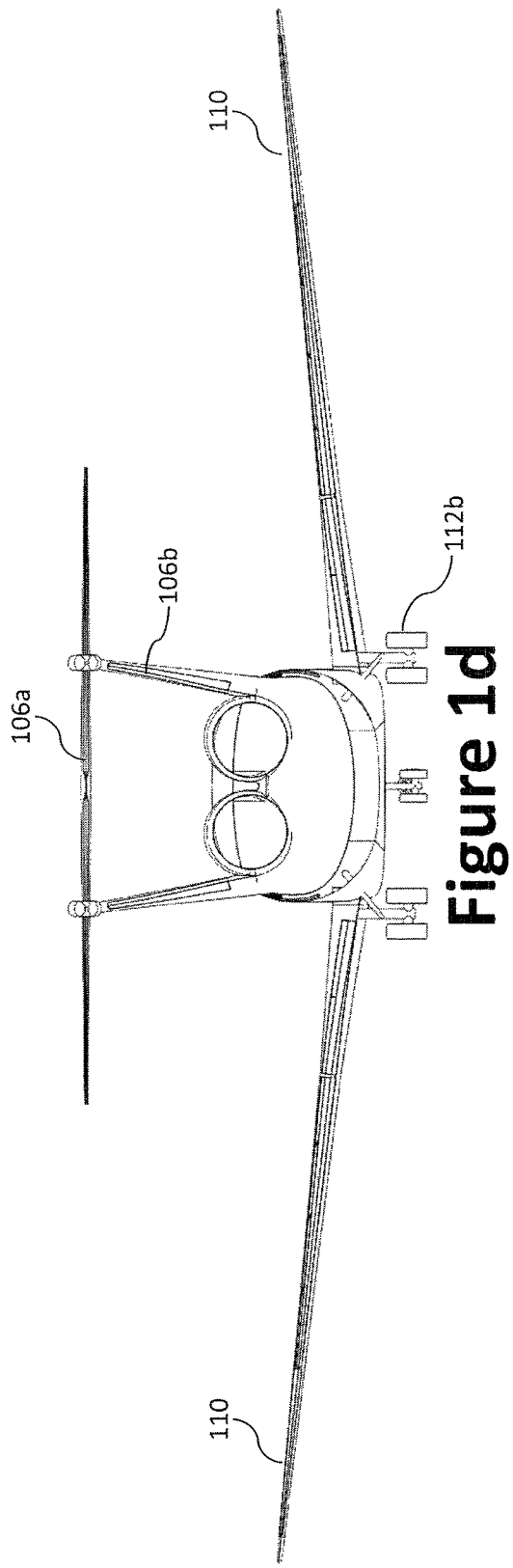
Figure 1E:
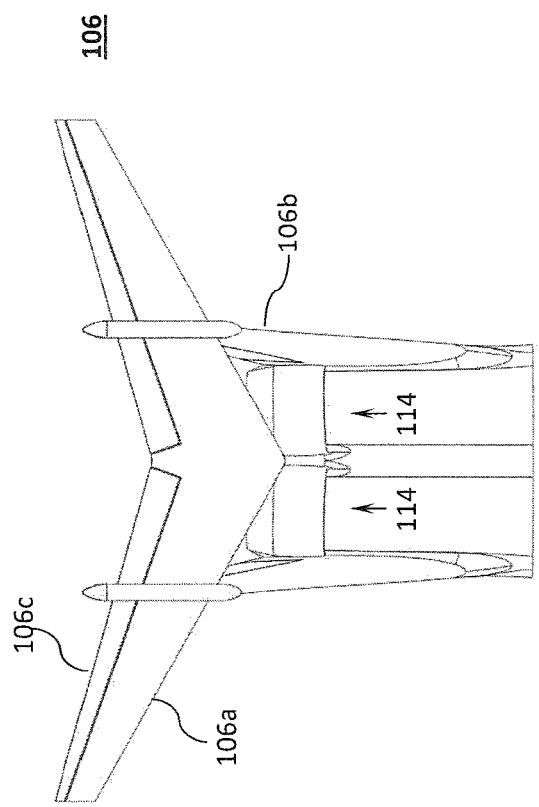
FIGS. 1e through 1g illustrate, respectively, top plan, side, and rear views of the aircraft's aft end.
Figure 1G:
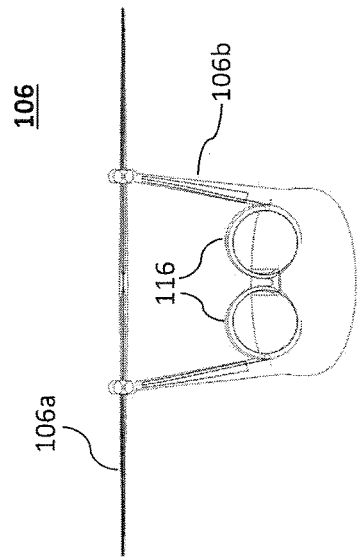
Figure 1F:
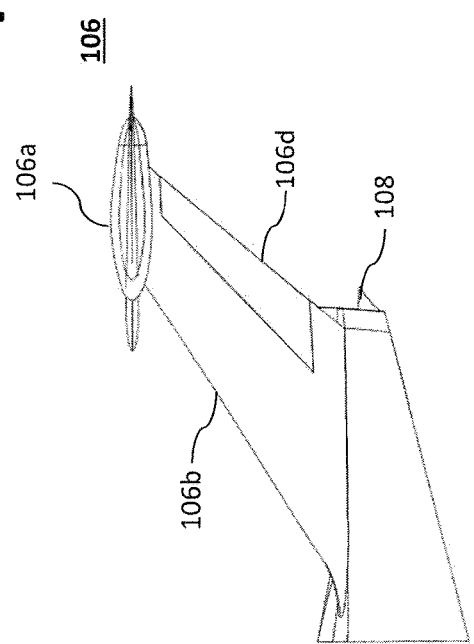

FIGS. 1a through 1g illustrate an example wide-body aircraft 100 according to an aspect of the present disclosure. Specifically, FIG. 1a illustrates an isometric view of the wide-body aircraft 100, while FIG. 1b illustrates a top plan view thereof. FIG. 1c illustrates a side view of the wide-body aircraft 100 and FIG. 1d illustrates a rear view thereof. FIGS. 1e through 1g illustrate, respectively, top, side, and rear views of the wide-body aircraft's 100 aft end with an empennage 106. In accordance with an aspect of the present disclosure, the wide-body aircraft 100 may have a wingspan of about 70 to 270 feet, more preferably about 90 to 140 feet, most preferably about 118 feet. The length of the wide-body aircraft 100 may be about 90 to 250 feet, more preferably about 90 to 140 feet, most preferably about 115 feet. As one of skill in the art would appreciate, however, the wide-body aircraft 100 can be scaled up (or down) to facilitate a particular purpose based on, for example, mission objectives (i.e., flight objective and/or flight plan).

While the wide-body aircraft 100 is generally described herein as being manned (e.g., it contains a cockpit for a human operator), the cockpit may be omitted when the wide-body aircraft 100 is configured for unmanned and/or fully autonomous aircraft (e.g., requiring no pilot control). For example, the wide-body aircraft 100 may be controlled by an onboard autonomous autopilot or remotely controlled over a wireless communication link by a human operator, a computer operator (e.g., remote autopilot), or a base station. An unmanned variation of the wide-body aircraft 100 may be scaled down (e.g., by about 40 to 60%, or about 50%) relative to its manned counterpart as a function of mission needs (e.g., maneuverability, range, payload capacity, etc.).

As illustrated, the wide-body aircraft 100 generally comprises a wide-body fuselage 102, two wings 110, an empennage 106, and an integrated propulsion system. In operation, the integrated propulsion system generates the thrust necessary for flight. The integrated propulsion system may be positioned, at least in part, within a set of integral nacelle cowling diffusers 116. The integrated propulsion system employs one or more propulsors, each propulsor having one or more propulsor fans 108 to generate thrust. The one or more propulsor fans 108 may be positioned in the integral nacelle cowling diffusers 116. The diameter of the propulsor fan 108 may be, for example, 12 to 60 inches, more preferable, 24 to 48 inches, most preferably, about 38 inches.

The propulsors may employ, for example, wet fuel engines (e.g., jet engines, jet turbines, turbofans, etc.), electric-driven (e.g., fans driven by one or more electric motors), or a hybrid thereof (e.g., where a wet fuel engine drives a generator to power an electric-driven motor coupled to the propulsor fan 108). The wide-body aircraft 100 further includes landing gear 112 (e.g., nose-end landing gear 112a and main landing gear 112b), one or more fuel tanks, an avionics bay, a payload bay, a heat exchanger (e.g., an air-cooled oil cooler with a fan), two or more forward-facing fan inlets 114 to supply air (e.g., from the boundary layer over the wide-body fuselage 102) to the propulsor fans 108, thereby facilitating boundary layer ingestion (BLI) via the integrated propulsion system.

The wide-body fuselage 102 may be segmented with one or more longitudinal structural components traversing/running longitudinally along the fuselage's 102 length (e.g., from the nose to the tail) and positioned along the center-line of the wide-body fuselage 102. For example, the wide-body fuselage 102 may generally comprise a forward fuselage subassembly 102a, a center fuselage subassembly 102b, and an aft fuselage subassembly 102c, where the forward, center, and aft subassemblies 102a, 102b, 102c are fabricated separately and joined via the one or more longitudinal structural components. The forward fuselage subassembly 102a generally comprises the cockpit, while the center fuselage subassembly 102b generally defines the payload section (e.g., for cargo and/or passengers), as the case may be. The aft fuselage subassembly 102c defines the tail section (e.g., the empennage 106) and includes, inter alia, the integral nacelle cowling diffusers 116 to house the propulsor fans 108 or another propulsion device. The aft fuselage subassembly 102c may be integral with, or coupled to, the empennage 106.

FIGS. 1e through 1g illustrate the general arrangement of the aft fuselage subassembly 102c and empennage 106. The aft fuselage subassembly 102c may be a semi-monocoque structure with two or three major aircraft skin pieces (e.g., panels) fastened and adhered around the internal structure. A monocoque structure refers to a structure in which the chassis is integral with the body, while semi-monocoque refers to a stressed shell structure that is similar to a true monocoque, but derives at least some strength from conventional reinforcement. The empennage 106 generally comprises one or more horizontal stabilizers 106a and vertical stabilizers 106b. The empennage 106 may include redundant control surfaces with two split rudders 106d and at least two elevators 106c. The empennage 106 may be configured as one of multiple tail configurations, including, for example, fuselage mounted, a cruciform, T-tail, a flying tailplane, or, as illustrated in FIGS. 1a through 1g, a pi-tail (i.e., π-tail). The three aerodynamic surfaces of the illustrated empennage 106 (i.e., the two symmetric vertical stabilizers 106b and the horizontal stabilizer 106a) may be fabricated using composite assemblies with core-stiffened skins.

The aerodynamic surfaces of the empennage 106 have primary lift spars and smaller aft spars through which they are attached to each other and the wide-body fuselage 102 in structurally determinant three point attachments with two locations on the main spar and the third on the aft spar. Example techniques for attachment of the vertical stabilizer 106*b* to the aft fuselage subassembly 102*c* include, for example: a spade-type spar extension that protrudes into the fuselage that has canted, mating offset bulkheads; and a "knuckle"-type multi-lugged fitting arrangement located at the surface intersection of the two bodies. While a V-shaped horizontal stabilizer 106*a* is illustrated, other shapes are contemplated, including straight horizontal stabilizers. The symmetric vertical stabilizers 106*b* may attach to a tail support structure that is aligned to the tail spar angle. The symmetric vertical stabilizers 106*b* may be arranged as a slight V, as illustrated in FIG. 1*d*.

The wide-body aircraft's 100 nose landing gear 112*a* and main landing gear 112*b* systems may employ air and/or oil type landing gear struts to absorb shock during taxiing and landing. In certain aspects, the shock absorption capability of the main landing gear 112*b* may be enhanced through trailing-link enhancements. For example, the main landing gear 112*b* may include a trailing-link suspension with one or more links connected between, and perpendicular to and forward of, the axle and a pivot point. The nose landing gear 112*a* steering system may employ an electromechanical actuator, commanded by the aircraft's 100 triplex flight computer (or other control system), driving the hydraulically boosted nose landing gear 112*a* steering ram through a spool valve to obtain the required steering angle. Steering angle feedback may be produced through a rotary potentiometer. An accumulator may be used to provide adequate pressure and flow during high bandwidth operations at low engine speeds. The nose landing gear 112*a* may be, for example, capable of steering angles of 60-90 degrees left and right. The nose landing gear 112*a* and main landing gear 112*b* may be retracted and extended through an electrically controlled, hydraulically actuated system using the onboard hydraulic power. The aircraft's 100 brake system may also be electrically controlled and hydraulically actuated. Control may be accomplished through, for example, the triplex flight control unit to an electromechanical actuator operating a hydraulic metering valve. Feedback may be accomplished through left and right brake system pressure sensors to the triplex flight control unit. Hydraulic pressure may be generated from the engine-driven hydraulic system and a backup braking system is accomplished through use of a pneumatic emergency pressure supply directly to the brake calipers through use of a shuttle valve.

The wide-body aircraft's 100 airframe structure, including the wide-body fuselage 102, wings 110, and empennage 106, may be fabricated using one or more metals, metal alloys, or composite structures, which can include composite laminates. For example, a plurality of metals, metal alloys, or composite structures may be assembled and joined through a co-curing process, a co-bonding process, or a mechanical attachment (e.g., using metal fittings, which may be fabricated using aluminum, titanium, lightweight alloys, etc.).

While the wide-body aircraft 100 (e.g., the wide-body fuselage 102) can be fabricated from aircraft grade metal and metal alloy, composite materials offer certain advantages over metals when fabricating structures with complex geometries. That is, a molded composite laminate may be shaped to conform with and provide a continuous structural mass to follow the contour of a complex geometry without the mass penalty or load concentrations of lapped or multiple joined metal components. With regard to the wide-body aircraft 100, as an example, the aft fuselage subassembly 102*c* provides a complex geometry to interface the upper surface of the center fuselage subassembly 102*b* with the integral nacelle cowling diffuser(s) 116, thereby directing the boundary layer from the center fuselage subassembly 102*b* to the forward-facing fan inlets 114 associated with the propulsor fans 108. Therefore, a composite structure may be more appropriate for the aft fuselage subassembly 102*c* and any other structures having a complex geometry 104.

The wide-body fuselage 102 may comprises a non-circular cross-section with a height-to-width aspect ratio that is wider (larger) than classic transports, which typically have height-to-width aspect ratios of approximately one to one (1.0:1.0) (i.e., cylindrical). The wide-body fuselage 102 may be shaped with, for example, a double-bubble fuselage, an oval fuselage, or another fuselage with a non-circular cross-section. As illustrated, unlike a traditional tube-and-wing configuration, the wide-body fuselage 102 employs a non-circular cross-section for a substantial portion of its longitudinal length.

As noted above, a wide-body fuselage 102 offers significant improvements in environmental performance and efficiency compared to a traditional tube-and-wing configuration. For example, replacing the traditional tube (i.e., having a circular cross-section) with a non-circular wide-body fuselage 102: (1) increases fuselage carryover lift, which shrinks and lightens the exposed wing area; (2) provides a nose-up trimming moment, which shrinks the horizontal tail and further shrinks the wing; (3) moves side-of-body load transfer points farther apart, giving a partial span-loading and weight reduction; (4) offers landing gear with a shorter load path into the side-of-body, resulting in lighter landing gear support structure; (5) allows for shorter landing gear struts due to its shorter tail; (6) provides fewer windows due to shorter cabin/wide-body fuselage 102, thus reducing weight; (7) reduces floor beam weight by using a floor center support, where desired; and (8) accommodates a twin-fin "Pi-tail" configuration, which lightens the horizontal tail, and accommodates integral nacelle cowling diffusers 116 for rear-propulsor installation.

In certain aspects, the height-to-width aspect ratio of the wide-body fuselage 102 is greater than one (i.e., >1.0). In other aspects, the height-to-width is, for example, between 1.0:1.01 and 1.0:3.0, more preferably between about 1.0:1.1 and 1.0:2.0, even more preferably between about 1.0:1.25 and 1.0:1.75, or most preferably about 1.0:1.5. As can be appreciated, the shape of the wide-body fuselage 102 may vary along its longitudinal length. Therefore, the height-to-width aspect ratio may also vary along the longitudinal length of the wide-body fuselage 102. For example, while the center fuselage subassembly 102*b* may have a substantially constant shape and height-to-width aspect ratio, the height-to-width aspect ratio of the forward fuselage subassembly 102*a* and the aft fuselage subassembly 102*c* may vary. In certain aspects, the height-to-width aspect ratio of the forward fuselage subassembly 102*a* and the aft fuselage subassembly 102*c* may even approach a height-to-width aspect ratio of about one (e.g., at the nose or tail).

Figure 2A:
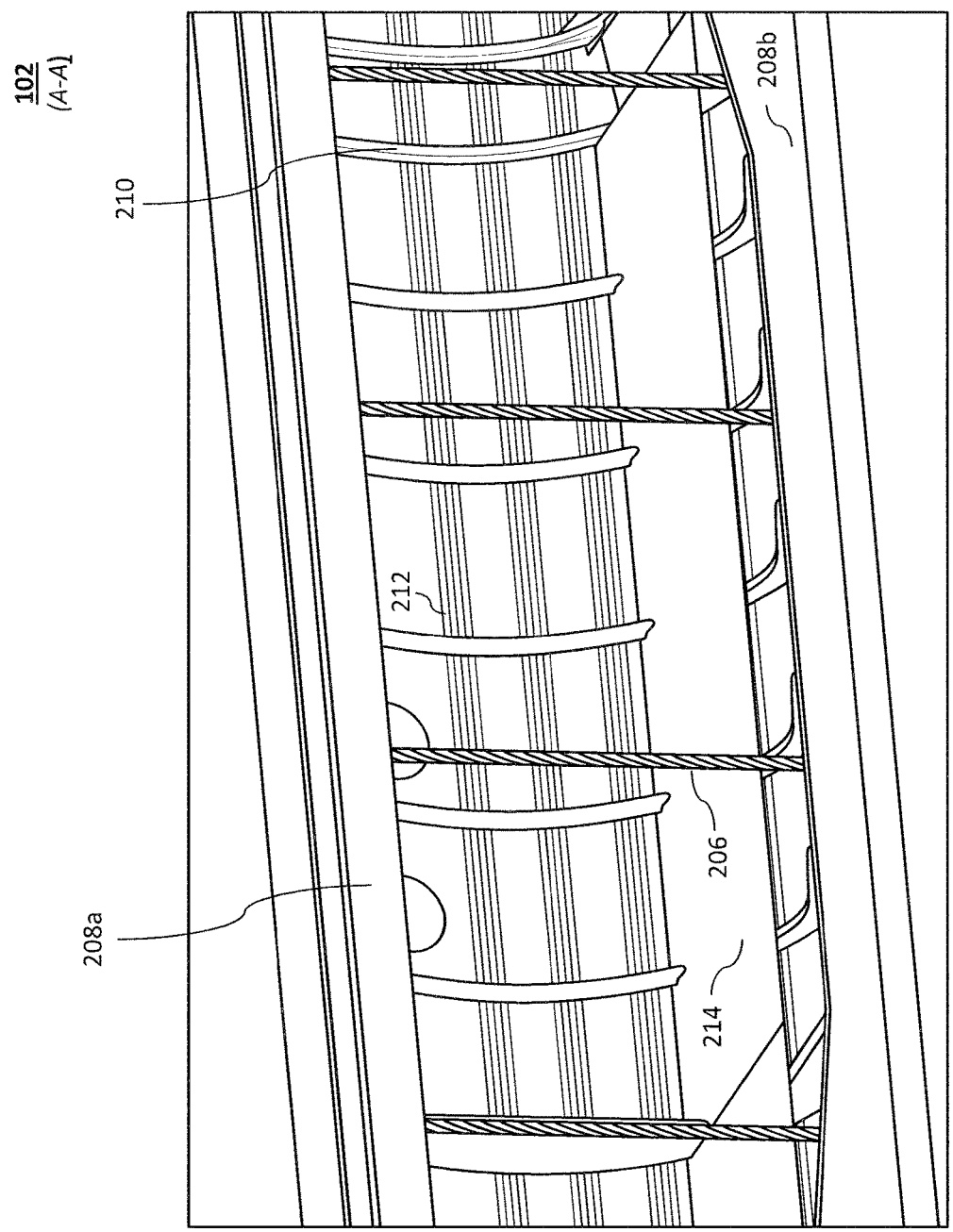
FIG. 2a illustrates a cut-away view of the wide-body fuselage taken along cross-section A-A of FIG. 1b.
Figure 2B:
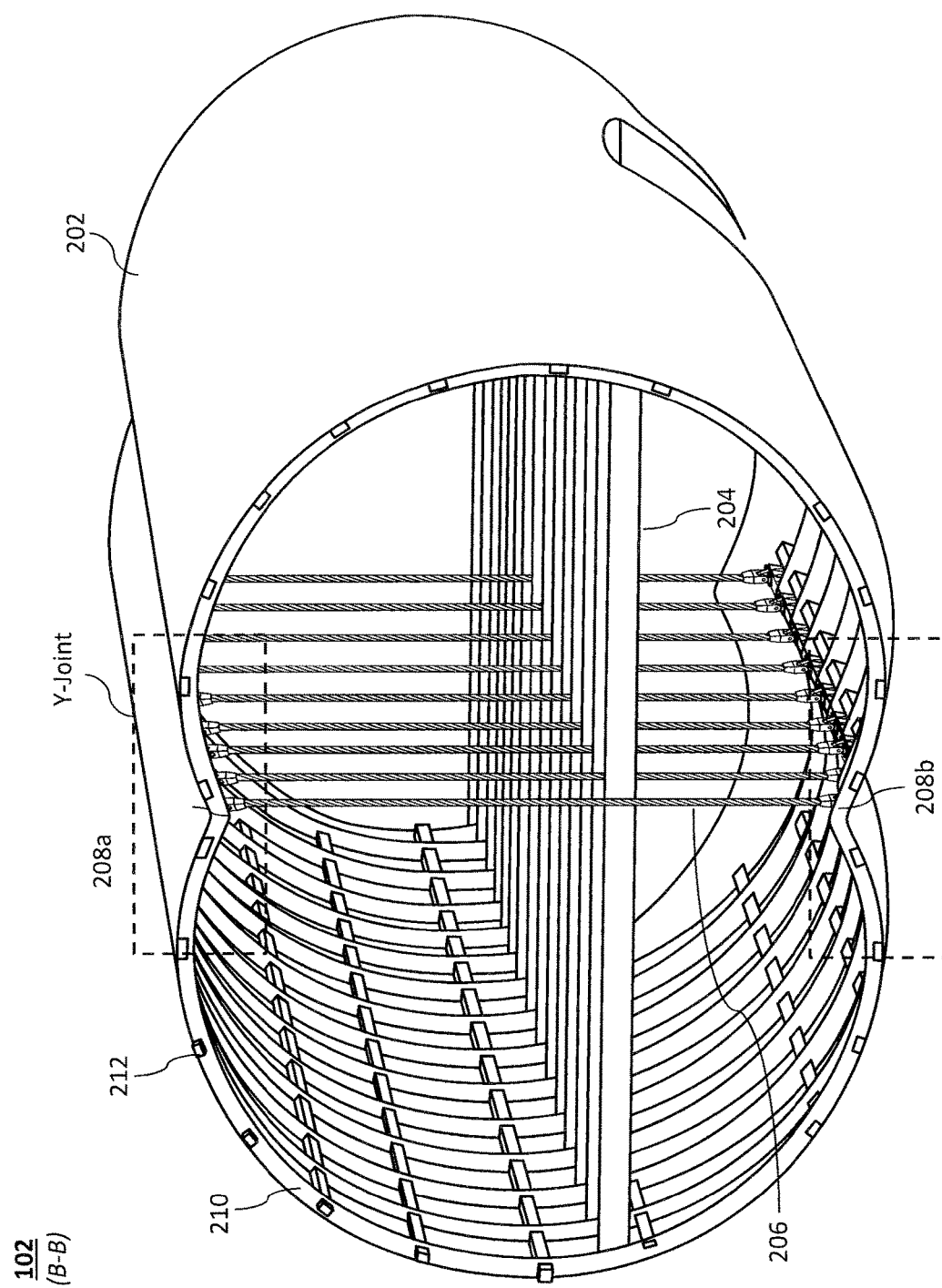
FIG. 2b illustrates a first cut-away view of the wide-body fuselage taken along cross-section B-B of FIG. 1c.

FIGS. 2*a* through 2*c* illustrate cross-sectional views of a pressurized wide-body fuselage 102 with a plurality of vertical tension members (e.g., cable bundles 206) arranged to react pressure loads in the wide-body fuselage 102. More specifically, FIG. 2*a* illustrates a cross-sectional view of the wide-body fuselage 102 taken along the longitudinal axis (along section cut A-A of FIG. 1*b*), while FIGS. 2*b* and 2*c* illustrate cross-sectional views taken along the lateral axis (along section cut B-B of FIG. 1*c*). As illustrated, the wide-body fuselage 102 may be constructed using a set of side-by-side fuselage subassemblies 200*a*, 200*b*, a set of longitudinal structural components 208, a plurality of spaced floor beams 204 arranged to support a cabin floor 214 within the wide-body fuselage 102, a plurality of cable bundles 206 to serve as vertical tension members between the set of longitudinal structural components 208, and an aircraft skin 202.

The set of side-by-side fuselage subassemblies 200a, 200b (the set defining a wide-body fuselage assembly or section), are coupled to one another via, for example, an upper longitudinal structural component 208a (e.g., a first longitudinal structural element) and a lower longitudinal structural component 208b (e.g., a second longitudinal structural element). The set of side-by-side fuselage subassemblies 200a, 200b may be generally cylindrical and fabricated from a plurality of stringers 212 and a plurality of frames 210. The plurality of frames 210 and the plurality of stringers 212 can then be covered by the aircraft skin 202 to provide an aerodynamic surface (e.g., smooth surface).

The wide-body fuselage 102 may be shaped such that the cross-section resembles two "bubbles" (or fuselage lobes) protruding from each side of the longitudinal structural component(s) 208. As illustrated, the shape of the wide-body fuselage 102 is generally defined by the wide-body fuselage section, where each fuselage subassembly 200a, 200b defines one of the two lobes/bubbles.

As illustrated, the longitudinal structural component(s) 208 may be arranged to run the length of the wide-body fuselage 102 (e.g., from the nose to tail). The outer mold line (OML) of the wide-body fuselage 102 is generally defined by the vertically joined side-by-side fuselage subassemblies 200a, 200b. The side-by-side fuselage subassemblies 200a, 200b may be joined via two longitudinal structural components 208, which are located at the lobe joints to form a lengthwise "Y-joint." That is, a lengthwise Y-joint may be positioned along the top (crown) and the bottom (belly) of the wide-body fuselage 102 to yield a substantially elliptic outer mold line wide-body fuselage 102 cross-section—a double-bubble cross-section. The two side-by-side fuselage subassemblies 200a, 200b can be joined at the center of the cross-section with either a cusped or parallel intersection.

The one or more longitudinal structural components 208 provide rigidity along the longitudinal length of the wide-body fuselage 102 and support the plurality of frames 210. As illustrated, the plurality of frames 210 may be joined to one another along the upper and lower center line of the wide-body fuselage 102 (in the longitudinal direction) via the one or more longitudinal structural components 208 (e.g., upper and lower longitudinal structural components 208a, 208b). The longitudinal structural components 208 may be, for example, keel beams or longerons. The one or more longitudinal structural components 208 may be fabricated from a metal alloy or a composite material. When assembled, the frames 210 define the side-by-side fuselage subassemblies 200a, 200b of the fuselage's 102 double-bubble shape. The plurality of stringers 212 are perpendicularly arranged (relative to the length of the frames 210) along the periphery of the double-bubble cross-section 200 defined by the frames 210 and configured run longitudinally the length of the wide-body fuselage 102. The plurality of stringers 212 supports the aircraft skin 202. The one or more longitudinal structural components 208 may be fabricated from a composite material, though a metal alloy is possible.

The aircraft skin 202 may be joined, at multiple fuselage-stations, to one or more of: the stringers 212 running along the length of the wide-body fuselage 102; the floor beams 204 spanning the wide-body fuselage 102; the upper and/or lower longitudinal structural components 208a, 208b; and the frames 210. The fuselage-stations may be positioned, for example, at each frame 210, each stringer 212, or at each intersection of a frame 210 and a stringer 212.

The stiffness of the aircraft skin 202 may be adjusted to affect the static aeroelastic behavior and the elastic dynamic modes of the wide-body aircraft 100. In one aspect, the aircraft skin 202 may be fabricated as a one-piece composite skin component and joined to longitudinal beam(s) (e.g., the upper and lower longitudinal structural components 208a, 208b and/or stringers 212) through a fastened or co-cured braided composite Y-clip. For example, to maximize producibility and performance, the aircraft skin 202 may be a composite material and co-cured with other components of the wide-body fuselage 102. In certain aspects, the stringers 212 and the aircraft skin 202 may be formed as an integral component.

The shape of each frame 210 may be selected as a function of the desired shape of the fuselage subassembly's 200a, 200b OML at a given position along the length of the wide-body fuselage 102. In one aspect, as best illustrated in FIG. 2c, the frames 210 can be rib-shaped (e.g., a circular ring that is clipped on one side). The frames 210 may have an arc length of, for example, between about $\pi$ radians and $3\pi/2$ radians, more preferably between about 3.5 radian and 4.5 radian, or most preferably and as illustrated, about $4\pi/3$ radians (i.e., about 240 degrees). The distal ends of each frame 210 are configured to mate with a corresponding (e.g., mirrored) frame 210 of the opposite fuselage lobe via the upper and lower longitudinal structural components 208a, 208b. For example, each of the side-by-side fuselage subassemblies 200a, 200b may be generally cylindrical, but clipped along its longitudinal length on at least one side to define a flat side. As will be appreciated, the flat sides of adjacent fuselage subassemblies 200a, 200b face one another when arranged side-by-side. Alternatively, a substantially rectangular fuselage section may be positioned between the flat sides of two clipped circular, or semi-circular, fuselage sections to define a generally oval fuselage.

Load flow through a wide-body fuselage 102 varies compared to a classic tubular fuselage. In addition, the cabin design pressure results in significantly higher bending stress in the region where the side-by-side cylinders are merged (i.e., at the Y-joint). Due to a wide, relatively flat, OML contour of the top and bottom portions of the wide-body fuselage 102 (a departure from traditional circular/tube-like fuselages), design trades are required to mass-optimize the internal structure. For example, traditional 'tube-like' fuselages take advantage of reacting pressure loads as membrane forces; thereby avoiding flat sections that react pressure loads as bending moments. In the case of a wide-body fuselage, inflections can occur at the flat sections of the top and bottom regions of the wide-body fuselage, thereby warranting reinforcement at the flat sections.

Reinforcement of the flat sections may be accomplished by strengthening the regions of the crown and belly where the fuselage lobes are joined (e.g., at the Y-joint; the cusped region). Instead of strengthening the Y-joint, a central structural element (e.g., upper and lower central structural elements) may be used to connect (or otherwise link) the upper and lower Y-joints of the wide-body fuselage 102 along its center line (e.g. butt line (BL) zero), which decreases the structural mass of the wide-body fuselage 102. For example, a wide-body fuselage 102 without a central structural element is approximately three times the mass of an equivalent aircraft with one or more central structural elements. This added weight (and complexity) can be attributed to the additional material needed at the Y-joint for reinforcement.

Therefore, a pressurized wide-body fuselage 102, or another fuselage having a drastic change in circumference, may require central structural elements to react internally with pressure at the flat sections in the aircraft skin 202.

A number of solutions are available for reinforcing the upper (crown) and lower (belly) regions; however, many of the solutions are impractical due to space constraints and aesthetics in the passenger cabin. One solution is to reinforce the crown and belly regions with larger frames and/or partial bulkheads to react the bending moments in these relatively flat sections. This approach increases the strength capability, however at the expense of increased weight. For example, structural complexities can be introduced in the cusped regions of the crown and belly where the fuselage lobes are joined (e.g., at the Y-joint). Another solution is to position one or more vertical tension members, which serve as central structural elements, between the crown and belly cusps to prevent the crown and belly cusps of the wide-body fuselage 102 from flattening due to outward pressure loads from the pressurized cabin. For example, a pi-preform in conjunction with a longitudinal structural component 208 (e.g., a stiff keel beam) can be used as an intermediary member between the aircraft skin 202 and vertical tension members to help distribute the concentrated loads from the vertical tension members into the aircraft skin 202.

In many fuselages, for example elliptical fuselages, inflections occur at the boundary between the passenger cabin 216 and baggage compartment 218, in which case the floor beams 204 react this expansion load internally. In the case of a wide-body aircraft 100, inflections can occur at the upper and lower regions, thereby warranting structural elements that run vertically therebetween; however, it is impractical to use beams or bulkheads (e.g., walls) due to space constraints and aesthetics in the passenger cabin 216. For example, a conventional beam design for a vertical member is space inefficient and heavy. Moreover, a conventional strut application also reacts compression loads, and therefore stability becomes a critical driver of sizing and weight of the strut. In addition, conventional vertical members, such as solid/monolithic tube strut designs, are more susceptible to catastrophic failure when a crack forms due to local damage.

Accordingly, it is advantageous to employ alternative structural elements that run vertically between the upper and lower regions. In one aspect, an efficient, cable bundle 206 may instead be used as a vertical member to react pressure loads at the upper and lower regions of the wide-body fuselage 102. As illustrated, the floor beams 204 and cable bundles 206 may be perpendicularly arranged relative to one another within the cavity defined by the wide-body fuselage 102. An advantage of the cable bundle 206 is that it mitigates crack and damage propagation. For example, if there is incidental damage to an individual strand of the cable bundle 206, the remaining strands will carry the load.

As best illustrated in FIG. 2a, each of plurality of cable bundles 206 is arranged vertically and distributed along the longitudinal length of the wide-body fuselage 102; between the upper and lower longitudinal structural components 208a, 208b. The cable bundles 206 serve as the primary structures to transfer loads between the top and bottom of the wide-body fuselage 102. The floor beams 204 define the horizontal cabin floor 214, which divides the cavity defined by the wide-body fuselage 102 along the lateral (horizontal) plane into the passenger cabin 216 and the baggage compartment 218. The floor beams 204 serve as a primary structure to transfer payload forces to the sides of the wide-body fuselage 102.

As illustrated, the cable bundle 206 may be attached between the upper and lower longitudinal structural components 208a, 208b of the wide-body fuselage 102 via a pair of cable couplings 220. The longitudinal structural components 208a, 208b may be, for example, keel beams or longerons running longitudinally through the wide-body fuselage 102. Unlike a conventional beam or strut, a cable bundle 206 is efficient under a tension load, while remaining flexible under compression load; therefore not buckling critical. Because a cable bundle 206 is not buckling critical, it can be more mass efficient than a strut or beam.

The horizontal cabin floor 214 may intersect each of the cable bundles 206 without coupling thereto, thereby isolating vertical and horizontal load paths. Alternatively, where it is desirable to link the vertical and horizontal load paths, the cable bundles 206 may be coupled to the horizontal cabin floor 214 (e.g., via the floor beams 204) to pass loads between the cable bundles 206 and other structures, such as the floor beams 204 and the frames 210. Therefore, depending on the design, the cable bundle 206 may either interconnect with, or pass through, the floor beams 204 and horizontal cabin floor 214, as best illustrated in the two versions of Detail A in FIG. 2c.

With reference to Detail A version 1 (V1), in a pass through arrangement, the cable bundle 206 passes through the horizontal cabin floor 214 (e.g., via a hole) and between adjacent floor beams 204, thereby isolating vertical and horizontal load paths. In embodiments where it is desirable that the cable bundles 206 pass loads between the cable bundles 206 and the horizontal cabin floor 214, a linked arrangement may be used. With reference to Detail A version 2 (V2), the cable bundle 206 can be attached to a floor beam 204 in a linked arrangement, thereby linking the vertical and horizontal load paths. The cable bundle 206 can be attached (e.g., bolted) to the floor beam 204 via one or more fittings 222, such as a lug fitting and a clevis, shackle, etc. For example, the cable bundles 206 may serve as a floor center support to support the horizontal cabin floor 214 by suspending it between the upper and lower longitudinal structural components 208a, 208b, thereby reducing the required size of the floor beams 204 and weight associated therewith. In lieu of a mechanical coupling, the cable bundles 206 (or associated structure) may also be co-cured or co-bonded with a component of the floor beam 204.

While a single cable bundle 206 is illustrated at each support station, two or more cable bundles 206 may be used to pass the loads between the upper and lower longitudinal structural components 208a, 208b at each support station. For example, a first cable bundle 206 may link the upper longitudinal structural component 208a to the floor beam 204 (via a pair of cable couplings 220; one positioned at each end of the first cable bundle 206), while a second cable bundle 206 may link the lower longitudinal structural component 208b to the horizontal cabin floor 214 (via a pair of cable couplings 220; one positioned at each end of the second cable bundle 206). In certain aspects, a first and second cable bundle 206 may be secured to a floor beam 204 using a common connection point (e.g., the same lug fitting).

Therefore, in one aspect, the wide-body fuselage 102 may comprise a set of side-by-side fuselage subassemblies 200a, 200b (defining a wide-body fuselage section of the center fuselage subassembly 102b, for example), a first and a second structural element 208a, 208b, and a plurality of tension members (e.g., cable bundles 206). Each of the first structural element 208a and the second structural element 208b can be arranged to traverse a longitudinal length of the wide-body fuselage section. The plurality of tension members may be arranged to manage tension between the first structural element 208a and the second structural element 208b. The plurality of tension members is configured to remain flexible under a compression load.

FIG. 3a illustrates a cross-sectional view of an example cable bundle 206 taken along section cut C-C of FIG. 2c, while FIG. 3b illustrates a cross-sectional view of the cable bundle 206 taken along section cut D-D of FIG. 2c. As illustrated, the cable bundle 206 may be fabricated using a plurality of strands 302 (e.g., yarns, plies, fibers) that are arranged into a larger and stronger form. For example, bundles of straight strands 302 can be resin infused or dry; alternatively, the plurality of strands 302 can be twisted or braided together. Depending on fabric properties, where one direction of fiber is straight and the other direction weaves over and under, there is a reduced stiffness in the direction of fibers that weave over and under. In certain aspects, the cable bundle 206 may be fabricated using two or more strand bundles 304, where each strand bundle 304 comprises a plurality of strands 302. For example, a plurality of strands 302 (e.g., 2 to 25 strands 302, more preferably 3 to 20 strands 302, most preferably about 5 to 10 strands 302) may be bundled together to define a strand bundle 304. A plurality of strand bundles 304 may then be bundled together to define the cable bundle 206. For example, the cable bundle of FIG. 3a comprises seven strand bundles; however, the number of strand bundles 304 per cable bundle 206 may be dictated by the number of strands 302 in each strand bundle 304. The cross-sectional area of the cable bundle 206 may be dictated by the predicted axial load in the cable bundle 206 multiplied by a factor of safety, and then divided by the ultimate tensile strength of the material. For example, the following equations may be used as guidance:

$$\text{Stress}=(FS*P)/A=\text{Force/Cross-sectional Area})$$

$$\text{Cross-sectional Area}=(FS*P)/(\text{Ultimate Tensile Strength})$$

The strands 302 may be fabricated from one or more materials including, inter alia, carbon fiber (e.g., low, intermediate, or high modulus carbon fiber), aluminum, steel, nylon, polyester, polypropylene, high modulus polyethylene (HMPE), and aramid. In one example, the strands 302 may be fabricated using carbon fiber strands and/or carbon fiber tow. An advantage of using a composite material to fabricate the cable bundle 206 is that the cable bundle 206 may also be lighter than alternative materials. A protective sleeve 306 can be wrapped around the cable bundle 206 to improve aesthetics and to provide protection from accidental damage. For example, the protective sleeve 306 can mitigate risk of damage to the outer strands 302 of the cable bundle 206. The protective sleeve 306 also mitigates risk of moisture and debris (e.g., contaminates, dirt, etc.) from penetrating the cable bundle 206. The protective sleeve 306 may be fabricated from a para-aramid synthetic fiber (e.g., Kevlar), or any other suitable material.

Figure 4A:
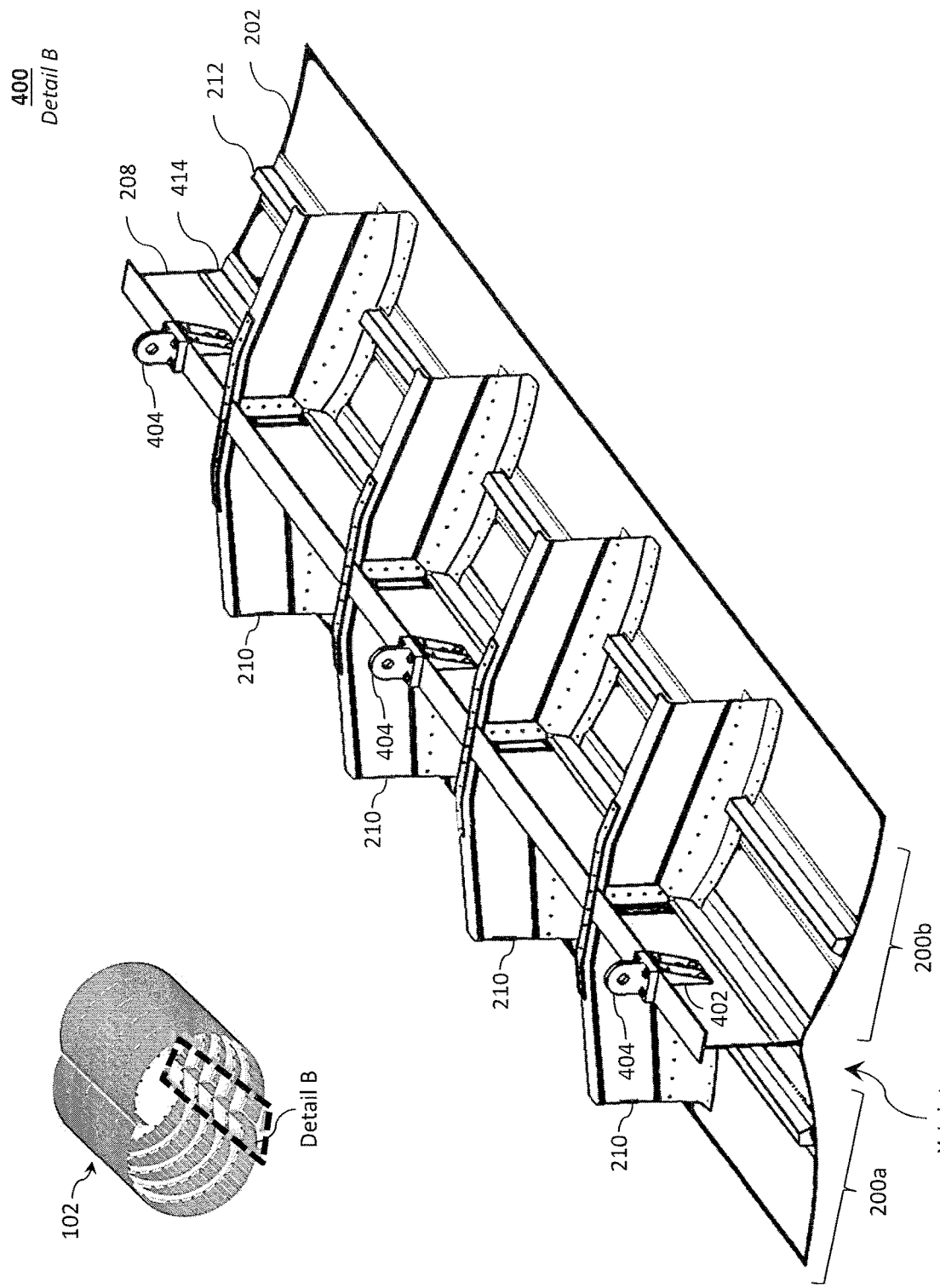
FIG. 4a illustrates an enlarged view of the wide-body fuselage at its Y-Joint, from Detail B.

FIG. 4a illustrates an enlarged view of the wide-body fuselage 102 at its Y-Joint 400 (Detail B). As illustrated, the side-by-side fuselage subassemblies 200a, 200b can be joined at the center of the cross-section with a longitudinal structural component 208 (located at the lobe joints, thus formation of a "Y-joint") using either a cusped or parallel intersection. The Y-joint may be defined by a longitudinal structural component 208, a 3-dimensional woven composite preform 414 (e.g., a pi-preform), and aircraft skin 202. The Y-joint transfers a portion of the pressure load between the aircraft skin 202 and the cable bundle 206. Where an oval OML is desired, for example, a panel 224 of aircraft skin 202, aka a faring, may be bridged across the Y-Joint between the side-by-side fuselage subassemblies 200a, 200b to provide a parallel intersection. In certain aspects, the structural Y-joint of the wide-body fuselage 102 may be composed of the co-cured aircraft skin 202 and 3-dimensional woven composite preform 414 and the longitudinal structural component 208, where the 3-dimensional woven composite preform 414 may be co-cured or co-bonded with the longitudinal structural component 208 (or a bulkhead) and, in some cases, the cable bundle 206; though a mechanical coupling is contemplated and described in connection with FIGS. 4b and 4c.

As illustrated, a plurality of lug fittings 404 may be distributed along the longitudinal length of the longitudinal structural component 208. The plurality of lug fittings 404 may be evenly distributed along the length of the longitudinal structural component 208, or localized to address areas where additional pressure is needed. For example, a lug fitting 404 may be positioned between each set of frames 210, or between every $n^{th}$ set of frames 210, where n is a number between 2 to 10). For example, FIG. 2b illustrates an example where a lug fitting 404 is positioned between each set of frames 210 (i.e., n=1), while FIG. 4a illustrates an example where a lug fitting 404 is positioned between ever other set of frames 210 (i.e., n=2). In the various illustrated examples, the ratio of frames 210 to floor beams 204 is 1:1, however other ratios are possible depending on, for example, weight requirements for the cabin floor 214.

The lug fitting 404 may be secured to the longitudinal structural component 208 via a gusseted fitting 402, which reduces localized stress on the longitudinal structural component 208. As illustrated, the longitudinal structural component 208 is positioned between the lug fitting 404 and the gusseted fitting 402. The lug fitting 404 and gusseted fitting 402 may be bolted to one another (and the longitudinal structural component 208). Alternatively, depending on the materials, the lug fitting 404 and gusseted fitting 402 may be adhered to, or co-cured/co-bonded, with the longitudinal structural component 208. As will be described, the cable bundle 206 can couple to the lug fitting 404 via one or more cable coupling arrangements. In other words, the lug fitting 404 serves as an attachment point for the cable bundle 206.

As illustrated, the longitudinal structural component 208 may be an I-beam. An I-beam provides a cross section having two spaced, parallel elements (known as flanges) coupled to one another via a perpendicular element (known as a "web"). The parallel elements provide a top surface and a bottom surface, while the perpendicular element provides two side surfaces. As illustrated, in the case of the lower longitudinal structural component 208b, the lug fitting 404 may be positioned on the top surface of the I-beam. While not illustrated in detail, the lug fitting 404 may be positioned on the bottom surface of the I-beam in the case of the upper longitudinal structural component 208a. A gusseted fitting 402 may be positioned on each side of the I-beam's perpendicular element and configured to bolt with each other and with the lug fitting 404 through one of the two spaced, parallel elements (either the top surface or the bottom surface, as the case may be).

Figure 4C:
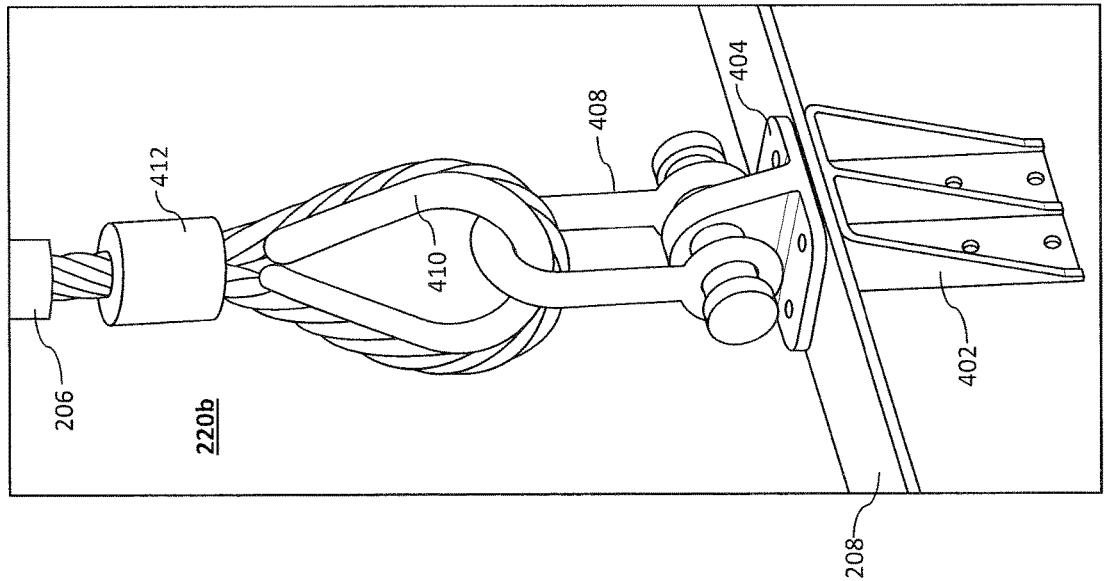
FIG. 4c illustrates an enlarged view of a second example cable coupling to transfer a pressure load from a cable bundle to a longitudinal structural component.
Figure 4B:
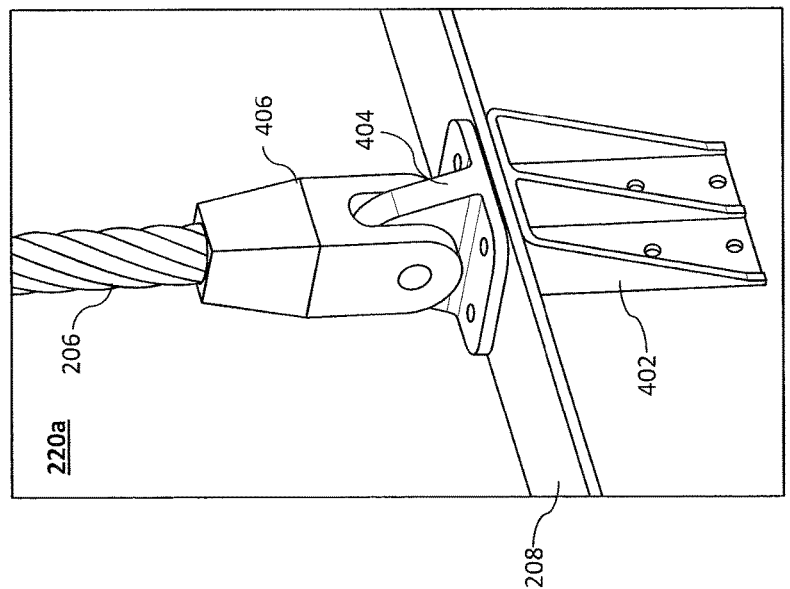
FIG. 4b illustrates an enlarged view of a first example cable coupling to transfer a pressure load from a cable bundle to a longitudinal structural component.

FIGS. 4b and 4c illustrate example cable couplings 220a, 220b to transfer a pressure load between the longitudinal structural component 208 and the cable bundle 206. Specifically, FIG. 4b illustrates a clevis cable coupling 220 (e.g., a bonded clevis) where the cable bundle 206 is coupled to the longitudinal structural component 208 (either upper or lower 208a, 208b) via a clevis fitting 406 and a lug fitting 404. The clevis fitting 406 may be bonded to the cable bundle 206 using, for example, a resin, adhesive, etc. Alternatively, the cable bundle 206 may be secured in the clevis fitting 406 using a bolt, crimp, or other mechanical coupling.

Other mechanical retention mechanisms are contemplated, such as the shackle cable coupling 220 illustrated in FIG. 4c. For example, rather than a clevis fitting 406, the cable bundle 206 may be coupled to the lug fitting 404 via a shackle 408, thimble 410, and a crimp sleeve 412. As illustrated, the shackle 408 may be coupled to the lug fitting 404 via a pin, a bolt, or another mechanical coupling. The cable bundle 206 may pass through the shackle 408 and fold upon itself to form a loop, where the end of the cable bundle 206 is coupled to the body of the cable bundle 206 via a crimp sleeve 412. The loop formed by the cable bundle 206 may include a thimble 410. The thimble 410 is positioned between the surface of the cable bundle 206 and the surface of the shackle 408, thereby protecting the cable bundle 206 from potential damage caused by the shackle 408 (e.g., due to vibration, rubbing, etc.). As noted above, if desired, the cable bundle 206 may instead be co-cured or co-bonded with the longitudinal structural component 208 (e.g., via a 3-dimensional woven composite preform 414), thereby obviating the need for additional hardware.

Figure 5A:
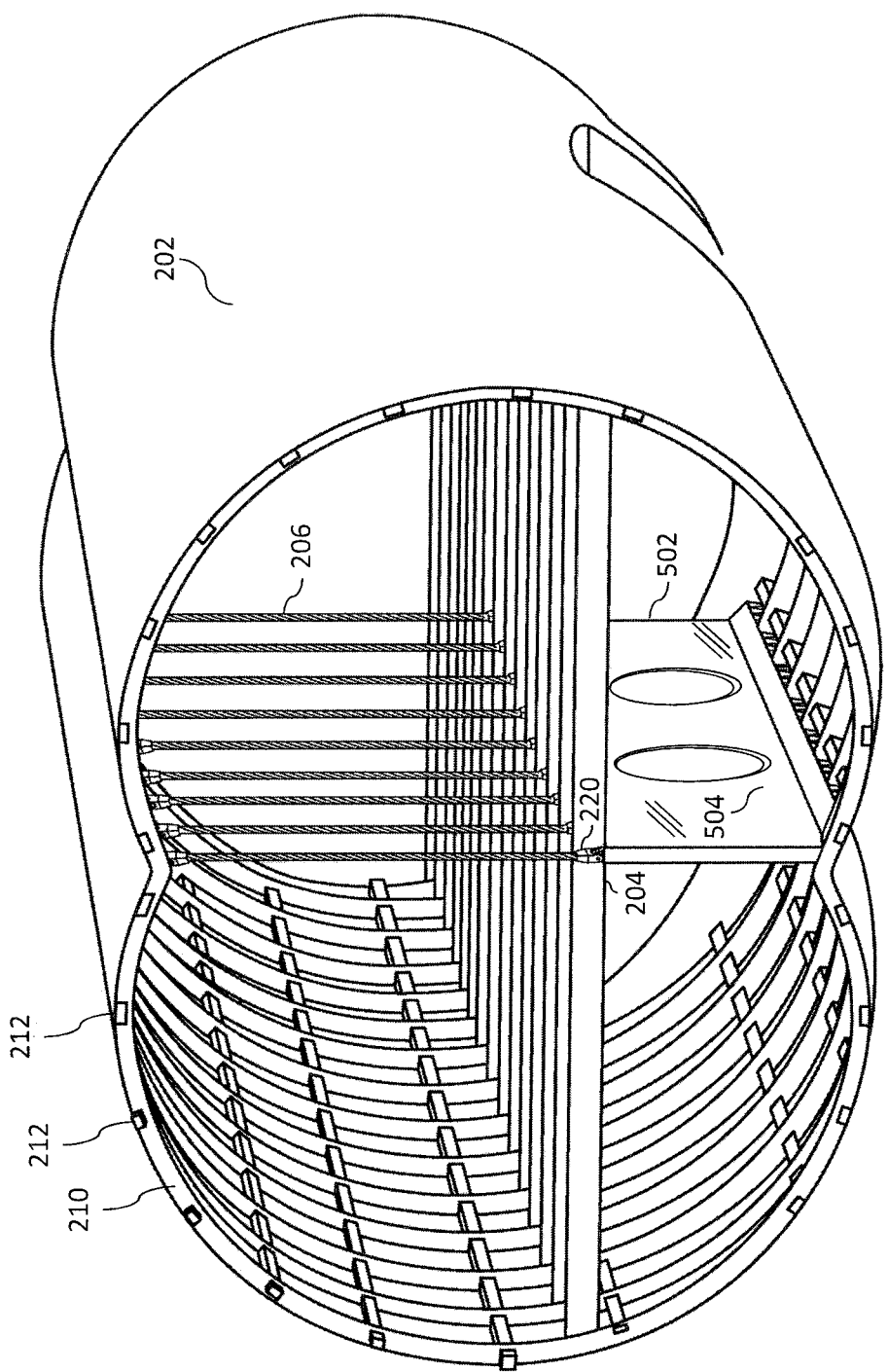
FIG. 5a illustrates a first cut-away view of a wide-body fuselage taken along cross-section B-B of FIG. 1c having a hybrid of a cable bundle and a bulkhead.
Figure 5B:
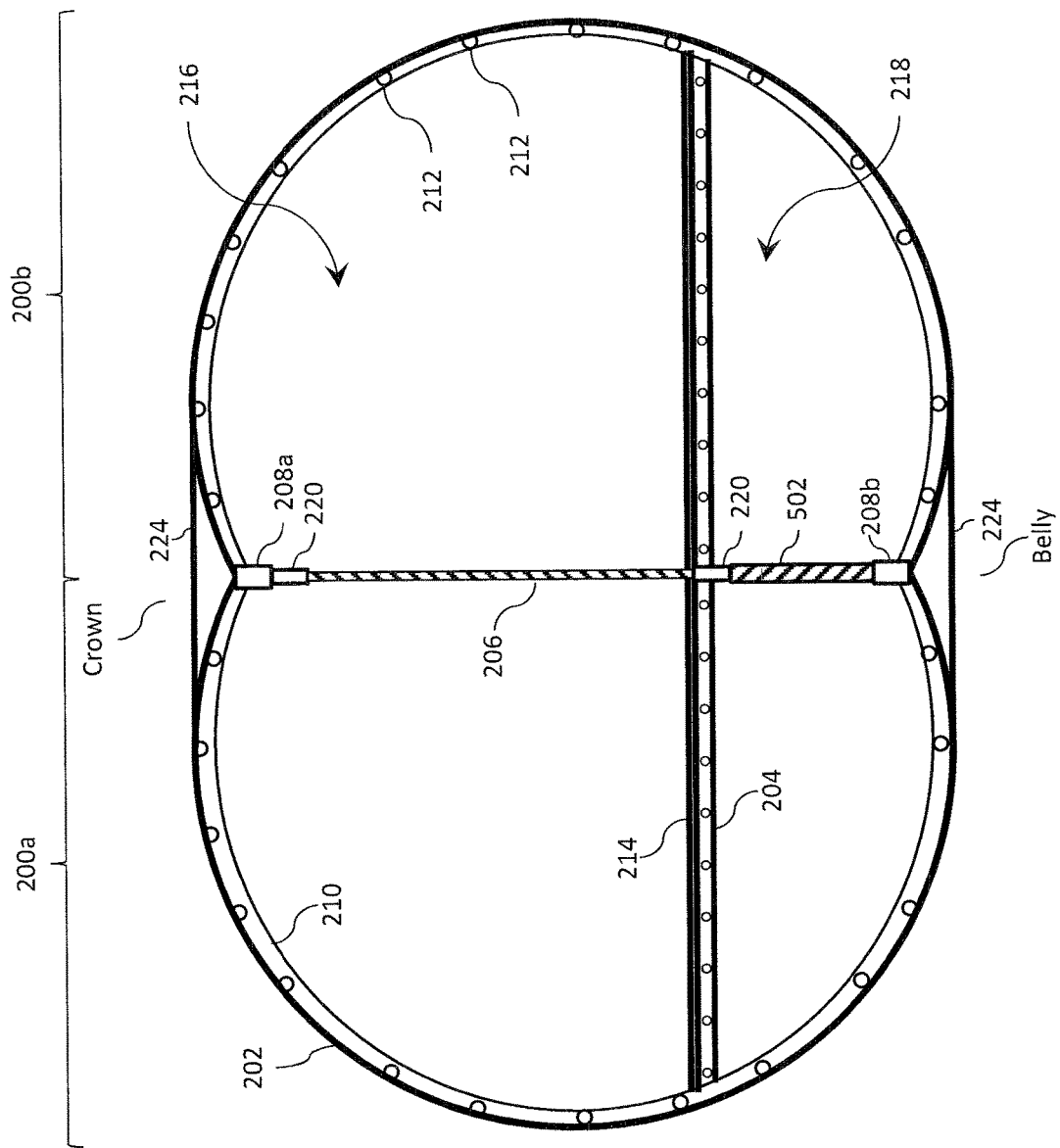
FIG. 5b illustrates a cut-away view of a wide-body fuselage taken along cross-section B-B of FIG. 1c having a hybrid of a cable bundle and a bulkhead.

While the cable bundle 206 is described as connecting the upper and lower longitudinal structural components 208, other configurations are contemplated. In certain aspects, a hybrid connection may be implemented. For example, a hybrid may be used that comprises a cable bundle 206 and a bulkhead 502 (e.g., a wall, such as a partial-height shear web). For example, as illustrated in FIGS. 5a and 5b, a cable bundle 206 may be used in conjunction with a bulkhead 502. As incorporation of a structure down the middle of a passenger cabin 216 is an unconventional approach, a bulkhead 502 may be used only is the baggage compartment 218. The bulkhead 502 may be used as a floor center support, thereby reducing the size requirements and weight of the floor beams 204.

The bulkhead 502 may couple to (or be integral with) the lower longitudinal structural component 208b and extend upward from the lower Y-joint to the horizontal cabin floor 214, at which point the bulkhead 502 terminates and is substituted by a plurality of cable bundles 206 (e.g., via a first cable coupling 220). The bulkhead 502 may be co-cured or co-bonded with the longitudinal structural component 208 (e.g., via a 3-dimensional woven composite preform 414). As illustrated, the cable bundle 206 may couple at a first end to the bulkhead 502 and at a second end to the upper longitudinal structural component 208a (e.g., via a second cable coupling 220). In operation, loads are passed between the upper and lower longitudinal structural components 208a, 208b via the cable bundle 206 and the bulkhead 502. To reduce weight and provide an access pathway between the left and right sides of the baggage compartment 218, the bulkhead 502 may include cutouts 504. As illustrated, the cutouts 504 may be circular or oval.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. A fuselage comprising:
a wide-body fuselage section;
a first structural element and a second structural element, wherein each of the first structural element and the second structural element is arranged to traverse a longitudinal length of the wide-body fuselage section;
a plurality of floor beams arranged to support a cabin floor within the wide-body fuselage section between the first structural element and the second structural; and
a plurality of tension members arranged to pass through the cabin floor and to manage tension between the first structural element and the second structural element, wherein each of the plurality of tension members is configured to pass between two adjacent floor beams of said plurality of floor beams and to remain flexible under a compression load.

2. The fuselage of claim 1, wherein the wide-body fuselage section comprises a set of side-by-side fuselage subassemblies coupled to one another via the first structural element and the second structural element.

3. The fuselage of claim 2, wherein the set of side-by-side fuselage subassemblies are arranged to define a non-circular cross-section along a lateral length of the wide-body fuselage section.

4. The fuselage of claim 3, wherein the non-circular cross-section comprises an outer mold line having a double-bubble shape or a generally elliptic shape.

5. The fuselage of claim 1, wherein each of the plurality of tension members comprises a cable bundle comprising a plurality of strands.

6. The fuselage of claim 5, wherein the plurality of strands comprises at least one of carbon fiber, steel, and aluminum.

7. The fuselage of claim 5, wherein the cable bundle comprises a protective sleeve.

8. The fuselage of claim 7, wherein the protective sleeve comprises a para-aramid synthetic fiber.

9. The fuselage of claim 5, wherein the plurality of strands is arranged to define a plurality of strand bundles that are arranged to define the cable bundle.

10. The fuselage of claim 9, wherein the plurality of strands is twisted or braided to define the plurality of strand bundles.

11. The fuselage of claim 5, wherein the cable bundle is coupled (1) at a first end to a first lug fitting fixed to the first structural element and (2) at a second end to a second lug fitting fixed to the second structural element.

12. The fuselage of claim 11, wherein the cable bundle is coupled to the first lug fitting via a first clevis fitting and to the second lug fitting via a second clevis fitting.

13. The fuselage of claim 11, wherein the first lug fitting is fixed to the first structural element via a first gusseted fitting and the second lug fitting is fixed to the second structural element via a second gusseted fitting.

14. The fuselage of claim 1, wherein the plurality of floor beams is generally perpendicular to the plurality of tension members.

15. The fuselage of claim 1, wherein the wide-body fuselage section comprises a plurality of stringers positioned along the longitudinal length, wherein a fuselage skin is joined to the plurality of stringers.

16. The fuselage of claim 1, wherein each of the first structural element and the second structural element couples with the wide-body fuselage section via a Y-joint.

17. The fuselage of claim 16, wherein the Y-joint is configured to transfers at least a portion of a pressure load between an aircraft skin and at least one of the plurality of tension members.

18. A method for managing tension in a wide-body fuselage, the method comprising:
providing a wide-body fuselage section having a first structural element and a second structural element, wherein each of the first structural element and the second structural element is arranged to traverse a longitudinal length of the wide-body fuselage, wherein a plurality of floor beams are arranged to support a cabin floor within the wide-body fuselage section between the first structural element and the second structural; and
coupling a plurality of tension members through the cabin floor and between the first structural element and the second structural element, wherein the plurality of tension members is configured to pass between two adjacent floor beams of said plurality of floor beams and to remain flexible under a compression load.

19. The method of claim 18, wherein each of the plurality of tension members comprises a cable bundle comprising a plurality of strands.

20. The method of claim 19, wherein the plurality of strands comprises at least one of carbon fiber, steel, and aluminum.

\* \* \* \* \*